(12) United States Patent
Barabe et al.

(10) Patent No.: US 7,140,536 B2
(45) Date of Patent: Nov. 28, 2006

(54) METHOD AND SYSTEM FOR HIGHLIGHTING MODIFIED CONTENT IN A SHARED DOCUMENT

(75) Inventors: Benoit Barabe, Snoqualmie, WA (US); Christopher H. Pratley, Seattle, WA (US); Peter P. Baer, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/018,409

(22) Filed: Dec. 20, 2004

(65) Prior Publication Data

US 2006/0136821 A1    Jun. 22, 2006

(51) Int. Cl.
*G06F 17/00* (2006.01)

(52) U.S. Cl. ............... 235/375; 707/203; 717/122; 717/170

(58) Field of Classification Search ......... 235/375; 709/224; 717/122, 170; 707/203
See application file for complete search history.

(56) References Cited

U.S. PATENT DOCUMENTS 6,449,624 B1 * 9/2002 Hammack et al. ......... 707/203
2002/0116702 A1 * 8/2002 Aptus et al. ............... 717/170
2002/0129045 A1 * 9/2002 Aoyama et al. ............ 707/203
2005/0044531 A1 * 2/2005 Chawla et al. ............. 717/122
2005/0138540 A1 * 6/2005 Baltus et al. .............. 715/511
2005/0193374 A1 * 9/2005 Harry et al. ............... 717/122

OTHER PUBLICATIONS

Internet article "Track Changes to a Microsoft Word Document" by Jane F. James, published by Swarthmore College Information Technology Services available at http://www.swarthmore.edu/Humanities/wa/WA_Program/OWL/Tracking_Changes.pdf.*
www.archive.org record for "http://www.swarthmore.edu/Humanities/wa/WA_Program/OWL/Tracking_Changes. pdf" searched Jan. 27, 2006.*

* cited by examiner

*Primary Examiner*—Jared J. Fureman
*Assistant Examiner*—Daniel A. Hess
(74) *Attorney, Agent, or Firm*—Merchant & Gould P.C.; Ryan T. Grace

(57) ABSTRACT

A shared document is displayed in a customized form with highlighted content that identifies significant portions of the document. The highlighted content draws a user's attention to the portions of the document that may have been modified, deleted or added by others since the last time the user accessed the document. The highlighted content directs a user to modified document portions that the user has not yet read.

23 Claims, 5 Drawing Sheets

300

Federal Income Tax Consequences of Cash Payout

The amount paid to you in cash will be reported on a Form 1099-DIV and taxable to you in 2004. While cash dividends will not be subject to early distribution or rollover penalties, a cash dividend distribution will be taxed as ordinary income and will not be eligible for the lower "qualified" tax rate.

Page 1 of 10

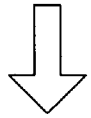

350

Federal Income Tax Consequences of Cash Payout

Page 1
Page 5     370
Page 9

The amount paid to you in cash will be reported on a Form 1099-DIV and taxable to you in 2004. While cash dividends will not be subject to early distribution or rollover penalties, a cash dividend distribution will be taxed as ordinary income and will not be eligible for the lower "qualified" tax rate.

360 — I don't think this applies to US, does it?

Page 1 of 10

*Fig. 3*

METHOD AND SYSTEM FOR HIGHLIGHTING MODIFIED CONTENT IN A SHARED DOCUMENT

BACKGROUND OF THE INVENTION

Shared document applications allow several different users to collectively share information. For example, many users may access the same document to add information to a shared research notebook. Changes made to the document may be shown as tracked changes that indicate modification details. All document changes are stored in the same file because the same document view is provided to all users that access the shared document. A user may access the shared document and be presented with a history of modifications, additions, and deletions made to the document. However, the tracked changes may provide a cluttered view of the document because the changes remain visible to the user even if the user has previously read the modified document portions.

SUMMARY OF THE INVENTION

The present invention is directed to a method and system for highlighting modified content in a shared document. A shared document is displayed in a customized form with highlighted content that identifies significant portions of the document. The highlighted content draws a user's attention to the portions of the document that may have been modified, deleted or added by others since the last time the user accessed the document. The highlighted content directs a user to modified document portions that the user has not yet read.

In one aspect of the invention, a document is downloaded to a client from a server. A determination is made whether content in the document has been modified since a previous download. The content that has been modified since the previous download is highlighted. The document is then displayed at the client.

In another aspect of the invention, a system for highlighting modified content in a shared document includes a server, an editor client coupled to the server, a reader client coupled to the server, and a modification highlight module that is located on the server or the reader client. The editor client accesses the document from the server and modifies the document. The reader client accesses the document from the server. The modification highlight module highlights content that has been modified in the document since the document was previously accessed by the reader client.

BRIEF DESCRIPTION OF THE DRAWINGS

FIG. 3 illustrates a shared document as it appears on a display before and after modifications are made to document content, in accordance with the present invention.

DETAILED DESCRIPTION OF THE PREFERRED EMBODIMENT

A shared document is displayed in a customized form with highlighted content that identifies significant portions of the document. The highlighted content draws a user's attention to the portions of the document that may have been modified, deleted or added by others since the last time the user accessed the document. The highlighted content directs a user to modified document portions that the user has not yet read.

Illustrative Operating Environment

Figure 1:
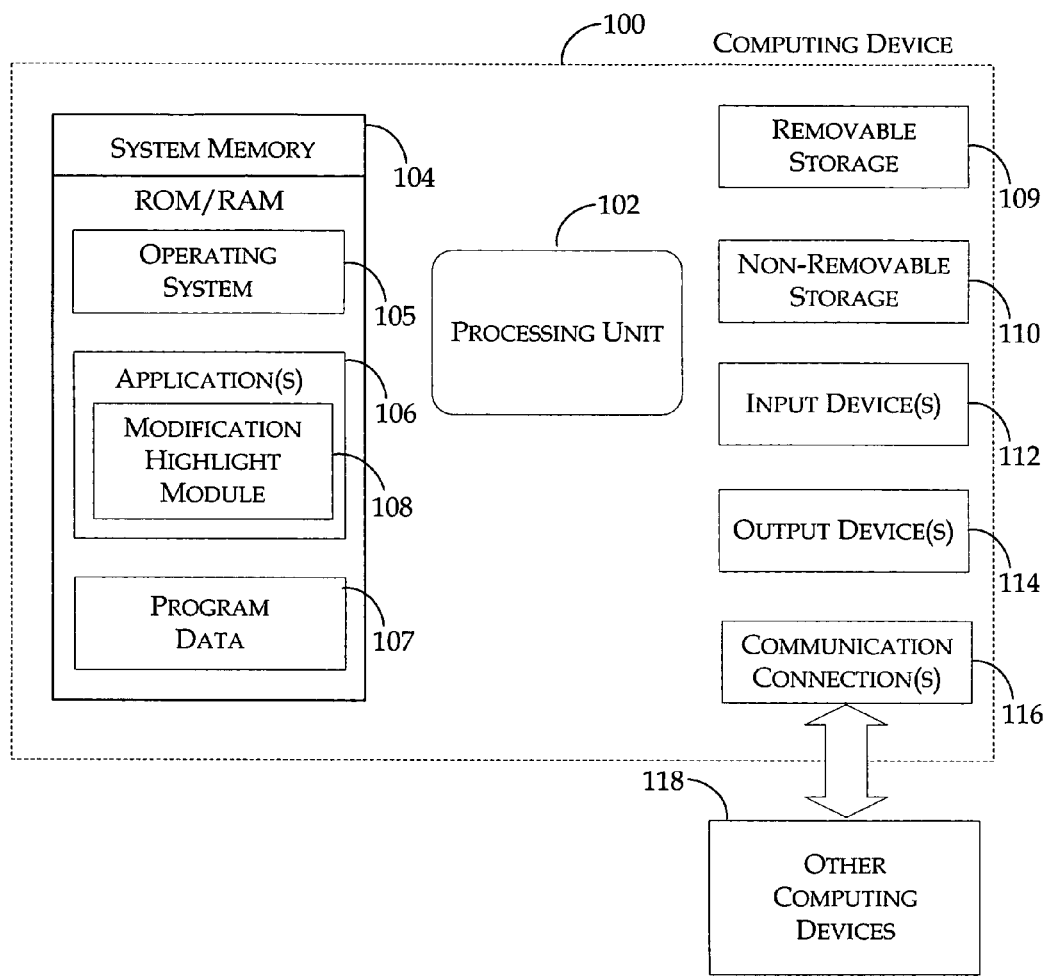
FIG. 1 illustrates a computing device that may be used according to an example embodiment of the present invention.

With reference to FIG. 1, one example system for implementing the invention includes a computing device, such as computing device 100. Computing device 100 may be configured as a client, a server, a mobile device, or any other computing device that interacts with data in a network based collaboration system. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. A modification highlight module 108, which is described in detail below, is implemented within applications 106.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Networks include local area networks and wide area networks, as well as other large scale networks including, but not limited to, intranets and extranets. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Highlighting Modified Content in a Shared Document

Figure 2:
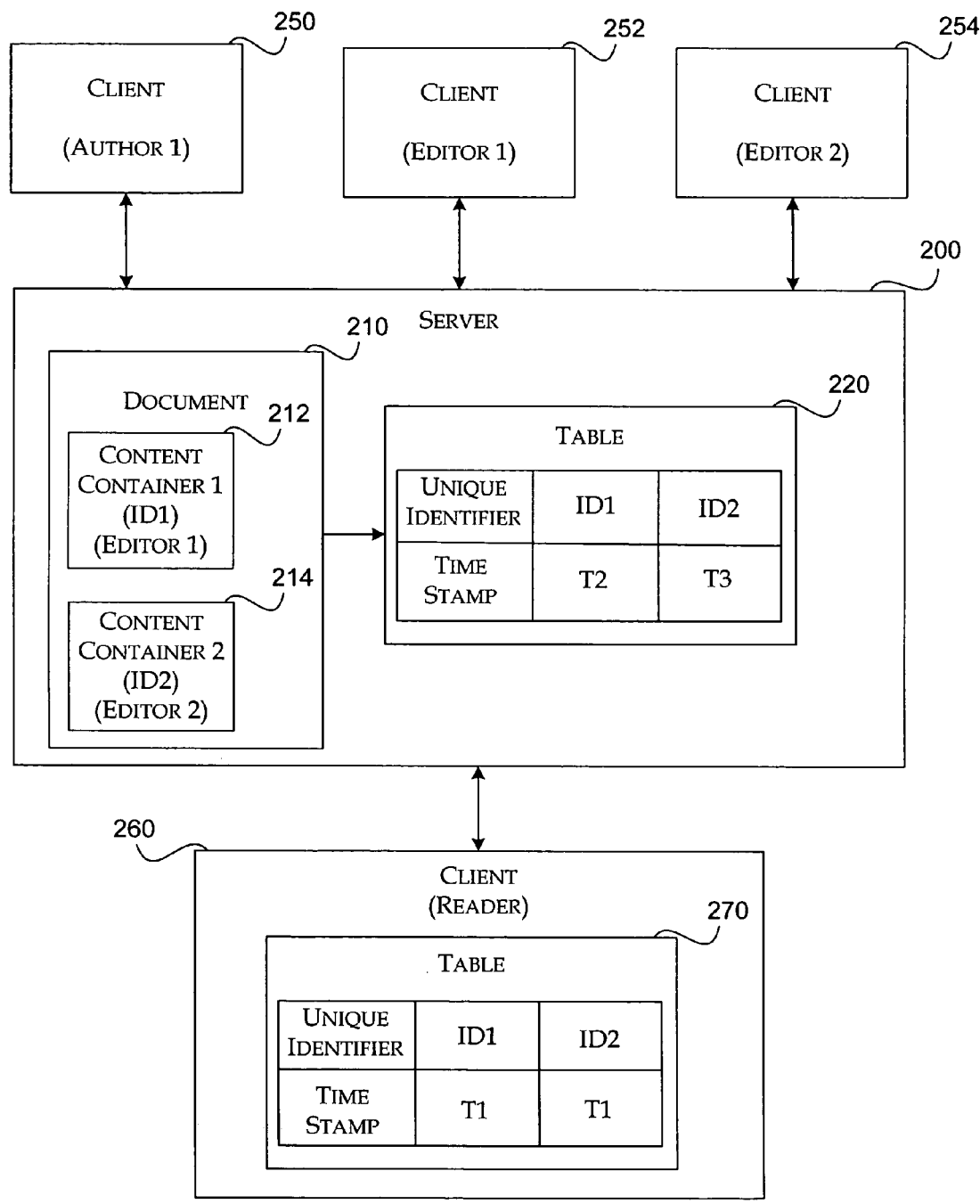
FIG. 2 illustrates a block diagram of a system for highlighting modified content in a shared document, in accordance with the present invention.

FIG. 2 illustrates a block diagram of a system for highlighting modified content in a shared document. The system includes server 200, author/editor clients 250, 252, 254, and reader client 260. Server 210 includes document 210 and table 220 that is associated with document 210.

Document 210 is a shared document that may be accessed from server 200 by clients 250, 252, 254, 260. Document 210 may be a read-only document or otherwise unable to be changed by a user. Document 210 may be presented to a user at reader client 260 with highlighted content that identifies which document portions have been modified by others but not yet read by the user. The highlighted content draws the user's attention to the portions of the document that the user may find significant. In one embodiment, the highlighted content may be presented in a list to provide a user with easy access to all the modified portions of the document. In another embodiment, the highlighted content may be exported to a separate file where a user may access the modified document portions.

Document 210 includes content containers 212, 214. Each content container includes document content (e.g., a word, a sentence, a paragraph, a page, a table, a picture, handwriting, a uniform resource locator, or any combination of data included in document 210). Content containers 212, 214 provide a dimension for document content that is grouped together. For example, a content container may correspond to a line, a paragraph, a page, or specific page elements (e.g., only the tables on a particular page). Each content container is identified by a unique identifier (ID1, ID2).

Table 220 includes unique identifiers (ID1, ID2) that identify corresponding content containers 212, 214. Each unique identifier is associated with a time stamp (T2, T3). The time stamp may indicate the time that the associated content container was created. If the content in the content container has been modified since the content container was created, the time stamp indicates the time when the content in the content container was last modified. Modified content includes content that has been changed, added or deleted. In one embodiment, table 220 may be updated each time document 210 is uploaded to server from clients 250, 252, 254. In another embodiment, document 210 and table 220 are continuously updated on server 200.

Reader client 260 includes table 270. Table 270 includes unique identifiers (ID1, ID2) that correspond to content containers 212, 214 in document 210. Unique identifiers (ID1, ID2) are associated with time stamps (T1). The time stamps in table 270 indicate the time when a user at reader client 260 read the content in the content container identified by the unique identifier. In one embodiment, the time stamp is applied when the user closes the document. Table 270 may be updated each time a content container is determined to have been read at reader client 260.

Each content container is also associated with an author/editor identifier (e.g., Author 1, Editor 1). The author/editor identifier associates the content container with the author who created the content container or, in the case where the content in the content container has been modified or deleted, the editor who last modified the content in the content container.

An author at client 250 (e.g., Author 1) may create content containers 212, 214 of document 210 at a time identified by a time stamp (e.g., T0). The author/editor identifier (Author 1) is associated with content containers 212, 214. Table 220 is updated for values of unique identifiers (ID1, ID2) and time stamp (T0). A user at reader client 260 may download document 210 from server 200. Document 210 is presented to the user with highlighted content containers 212, 214 to draw the user's attention to the newly added content that has not yet been read. In one embodiment, the author/editor identifier associated with the content container indicates who created/modified/deleted the content. For example, "Author 1" may be displayed in document 210 proximate content containers 212, 214. The user may read the content in content containers 212, 214 at a time identified by a time stamp (e.g., T1). Time stamp T1 associated with unique identifiers ID1, ID2 is updated in table 270 when it is determined that content containers 212, 214 have been read.

An editor at client 252 (e.g., Editor 1) may download document 210 and edit content container 212 at a time identified by a timestamp (e.g., T2). The author/editor identifier (Editor 1) is associated with content container 212. An editor at client 254 (e.g., Editor 2) may download document 210 and edit content container 214 at a time identified by a time stamp (e.g., T3). The author/editor identifier (Editor 2) is associated with content container 214. Table 220 is updated for values of time stamps (T2, T3). Document 210 and table 220 are uploaded from clients 252, 254 to server 200.

The user at reader client 260 may download document 210 from server 200. A determination is made about which content the user has not read since the previous download of document 210 from server 200 to reader client 260. Table 270 indicates that the user at reader client 260 has not accessed document 210 since the time identified by time stamp T1. Table 220 indicates that content containers 212, 214 have both been modified since the time identified by time stamp T1 because T1 identifies an earlier time than time stamps T2, T3. Thus, the user at reader client 260 is determined to not have read the modified content in content containers 212, 214. Document 210 is presented to the user with highlighted content containers 212, 214 to draw the user's attention to the newly modified content that has not yet been read. In one embodiment, the author/editor identifier (e.g., Editor 1, Editor 2) appears in document 210 proximate the corresponding content containers 212, 214 such that the user is informed about who modified the highlighted content. The user may read the content in content containers 212, 214 at a time identified by a time stamp (e.g., T4). The value of time stamp T4 is updated in table 270 to indicate the time that the user last read the content containers associated with the unique identifiers. Document 210 is closed and uploaded from reader client 260 to server 200.

The time stamp values in table 220 remain at T2, T3 until further modifications, deletions or additions are made to document 210. The user at reader client 260 may access document 210 again from server 200. Document 210 is presented to the user without any highlighted content when no additions, deletions or modifications have been made to document 210 since the last time the user accessed document 210. In other words, a comparison of the time stamps between table 270 and table 220 indicates that content in content containers 212, 214 has not been modified, deleted or added since the previous download of document 210 from server 200 to reader client 260.

A user may not read all of the highlighted content before closing document 210 and uploading to server 200. For example, the user may only read the highlighted content identified in content container 212 without reading the highlighted content in content container 214. The next time the user accesses document 210 from server 200, any content that has been modified, deleted or added since the last user access is highlighted, and the content highlighted in the previous document version that was not read by the user remains highlighted (e.g., content container 214).

For example, a shared document may include ten pages. An editor may make modifications to content on pages two, five, and nine. A reader may then access the document. The document presents the modifications as highlighted content. The reader may view pages one through five before closing the document. The reader may later access the document but no further modifications have been made to the document since the reader's last access. The document includes highlighted content on page nine. The modifications on pages two and five are not highlighted because the reader already viewed that content.

The user may define the feature which determines whether or not highlighted content in a document has been read. In one embodiment, the highlighted content is determined to have been read by the user when the page where the highlighted content is located is displayed on a monitor of the user's computer. In another embodiment, a determination is made that the user read the highlighted content when the entire corresponding content container is displayed to the user. In yet another embodiment, a user is determined to have read the highlighted content when the highlighted content is displayed on a user interface for a predetermined period of time. For example, a small content container (e.g., one sentence) may be determined to have been read when the content container appears on the user's computer monitor for at least three seconds. A larger content container (e.g., an entire page) may be determined to have been read when the content container appears on a user display for at least fifteen seconds.

The locally stored table (e.g., table 270) provides the user with a customized experience when presented with document 210 having highlighted content that has been modified since the previous user access of document 210. Two different users who access the same shared document at the same time may be presented with different highlighted content because the users previously accessed the document at different times and a different amount of modifications/additions may have been made to the document since the previous access. For example, one user may be presented with a document that does not include any highlighted content because no one modified the document since the last time the user accessed the document. Another user may be presented with highlighted content throughout the document because the user did not access the document for an extended period and several users may have modified the document during that period.

Shared document applications are concerned with providing a repository for sharing knowledge rather than displaying formal documents. Thus, maintaining a modification history is not as important as the content added to the document. In one embodiment, the user is not provided with an entire history of modifications that have been made to the document since the last user access. Rather, the user is presented with highlighted content that indicates the latest document version at the time the document is accessed. For example, several different changes by many different editors may be made to the same content container in a document between the time that the user last accessed the document and the time of current user access. The modified content container is highlighted in the document and includes only the most recent version. In another embodiment, the modified document does not indicate which content has been deleted. In yet another embodiment, deleted content may be crossed-out and highlighted. In still yet another embodiment, content that the user has changed is not highlighted when viewed by the user because it is presumed that the user has read the modified content.

In one embodiment, an editor may rearrange content containers in the document without modifying any content within the content containers. The values in the table corresponding to the document are not changed. The rearranged content containers are not highlighted in the document because the user has already read the content in the content containers. Merely moving a content container to a new location in the document is not a significant enough modification to be brought to the user's attention.

The author/editor identifier identifies the particular author/editor who created/modified the content in the corresponding content container. In one embodiment, the author/editor identifier is used to highlight content in different colors such that particular additions/modifications may be associated with the corresponding author/editor. Thus, a reader may easily determine which author/editor added/modified the highlighted content based on the color associated with the author/editor.

FIG. 3 illustrates a shared document as it appears on a display before and after modifications are made to document content. Display 300 shows a "clean" version of a document (i.e., no highlighted content). A user may be presented with a clean document version when the user accesses the document from a server and no modifications have been made to the document since the last time that the user accessed the document. The user may then read and modify the document before closing and uploading the document to the server.

Display 350 shows a version of the document that includes highlighted content 360. Highlighted content 360 draws the attention of the user to the document content that may have been modified since the last time the user accessed the document, or to modified document content that the user has not yet read. Highlighted content 360 includes text that has been added to the shared document by another user. In one embodiment, highlighted content 360 may be displayed in a color that is visually distinct from the color of non-modified document content. In another embodiment, highlighted content 360 may be a background color that distinguishes the modified document content from the non-modified document content. In yet another embodiment, tabs 370 that identify document pages where the highlighted content is located are presented in the margin of the document. The user may select a tab and be brought to the page that includes the highlighted content. For example, a user may easily determine that the document includes highlighted content on pages 1, 5 and 9 because tabs 370 identify those pages in the margin of the document. In yet another embodiment, the user may access commands to navigate highlighted content in order of appearance in the document or in chronological order based on when the content was modified. In still another embodiment, highlighted content 360 may be presented in a list such that a user can view all the modified portions of the document together. In still yet another embodiment, highlighted content 360 may be exported to a separate file where a user may access the modified document portions.

Figure 4:
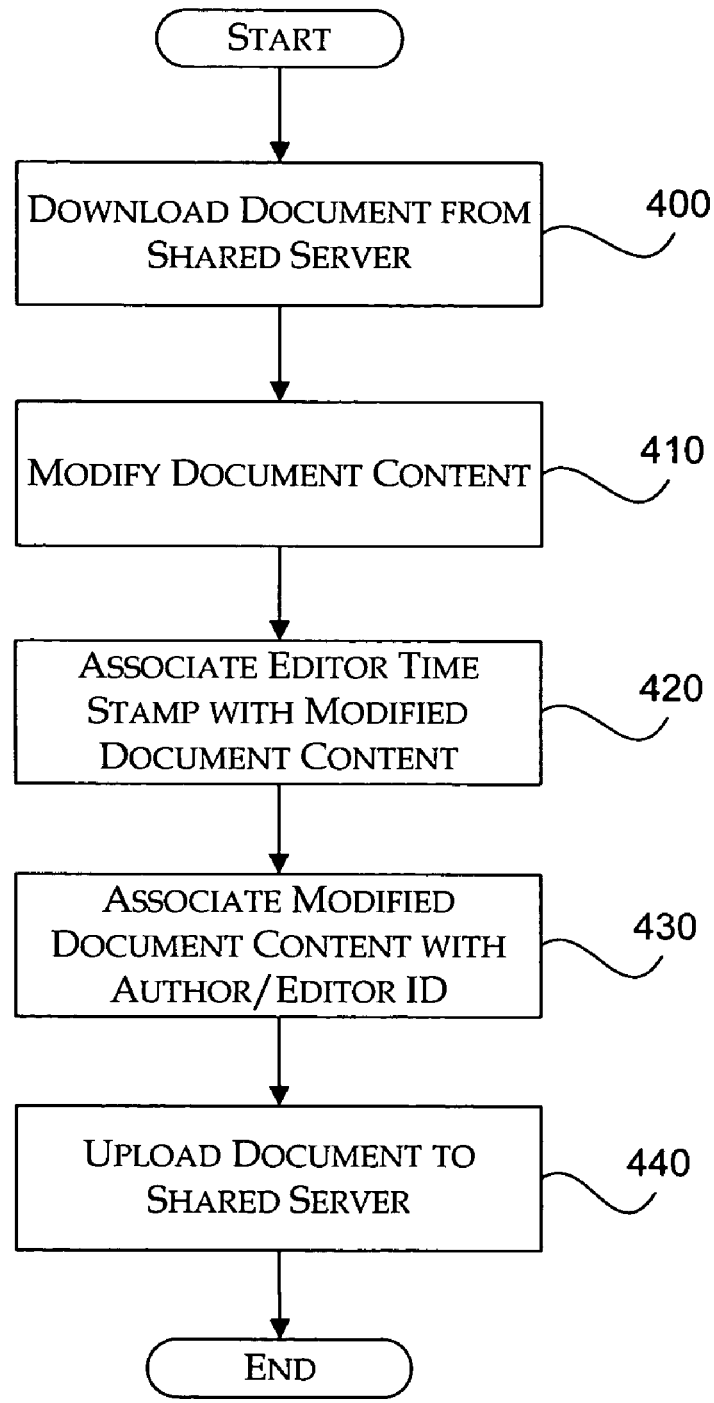
FIG. 4 illustrates an operational flow diagram illustrating a process for modifying content in a shared document, in accordance with the present invention.

FIG. 4 illustrates an operational flow diagram illustrating a process for modifying content in a shared document. The process begins at a start block where a document is stored on a shared server.

Moving to block 400, the document is downloaded from the shared server. The document may be downloaded from any client connected to the server. The document may be downloaded by users who are authorized to edit the document. Proceeding to block 410, document content is modified by an editor. Modified content may also include content that is added to the document by an author and content that is deleted from the document. The modified content is associated with a unique identifier.

Advancing to block 420, an editor time stamp is associated with the modified document content. The editor time stamp is associated with the corresponding modified document content via the unique identifier. The editor time stamp identifies the time when the document content was modified in, deleted from or added to the document. In one embodiment, the editor time stamp is associated with the unique identifier when the user closes the document.

Transitioning to block 430, an author/editor identifier is associated with the modified content to identify who created/modified/deleted the document content. The author/editor identifier may be associated with the corresponding modified document content via the unique identifier. Continuing to block 440, the document is uploaded to the shared server. Processing then terminates at an end block.

In one embodiment, the document and a table that includes the unique identifier, the author/editor identifier, and the time stamp are continuously updated on the server. The document and the table may be continuously updated by multiple users.

Figure 5:
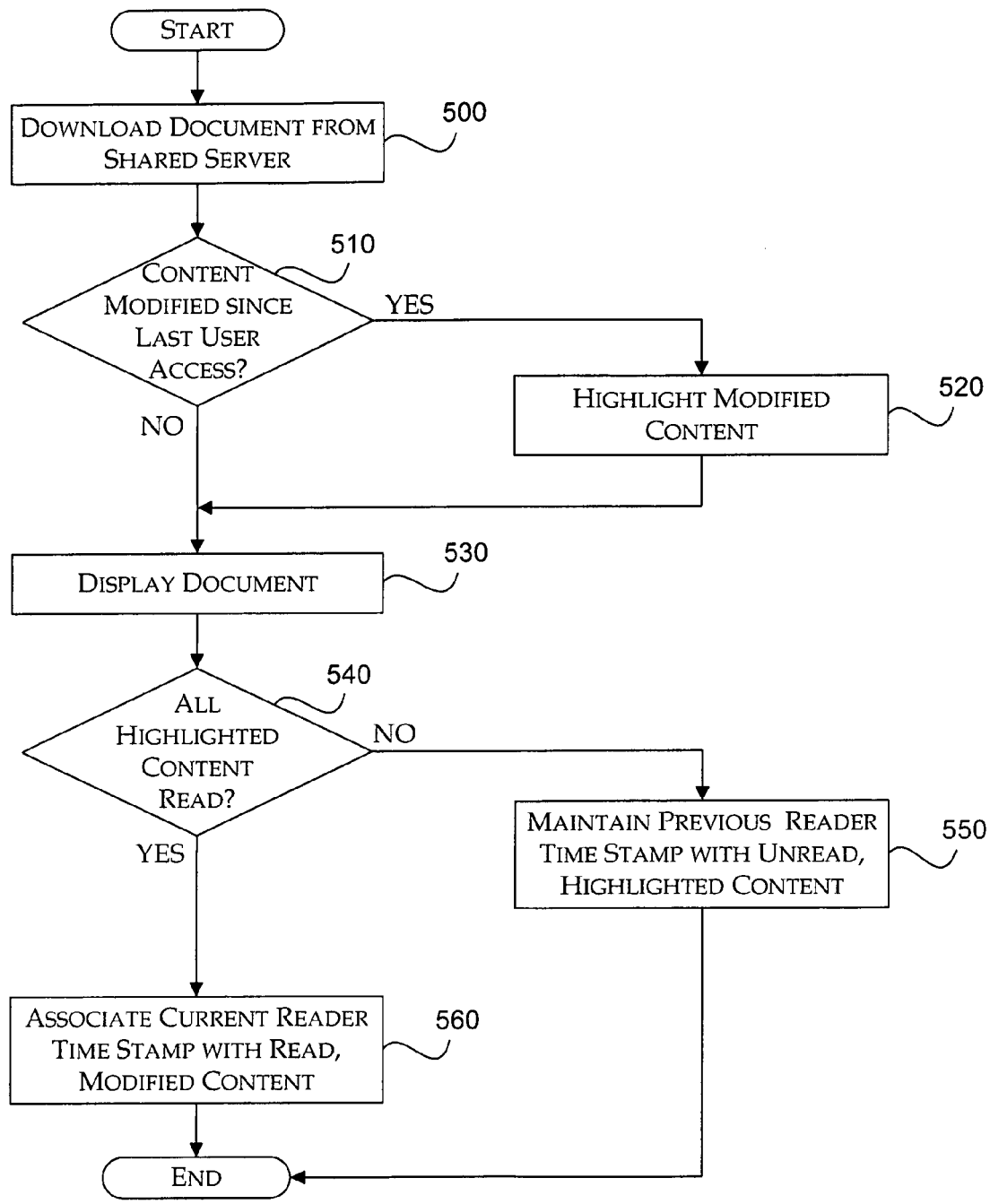
FIG. 5 illustrates an operational flow diagram illustrating a process for highlighting modified content in a shared document, in accordance with the present invention.

FIG. 5 illustrates an operational flow diagram illustrating a process for highlighting modified content in a shared document. The process begins at a start block where a shared document is stored on a server.

Moving to block 500, the document is downloaded from the shared server. The document may be downloaded from any client connected to the server. The document may be downloaded by users who are authorized to edit the document, or by users who are only authorized to read the document.

Proceeding to decision block 510, a determination is made whether any content in the document has been modified since the last time the user accessed the document. Modified content includes document content that has been changed, deleted or added. The document is associated with a reader time stamp. The reader time stamp indicates the last time that the user accessed the document. The document is determined to include modified content when the reader time stamp identifies a time that is earlier than the time identified by the editor time stamp. The reader and editor time stamps are associated by the unique identifier. If the document has not been modified since the last time the user accessed the document, processing continues at block 530. If the document has been modified since the last time the user accessed the document, processing continues at block 520.

Advancing to block 520, the modified content in the document is highlighted. The highlighted content distinguishes the modified portion of the document from the rest of the document. In one embodiment, the modified document content is presented in a color that is visually distinct from the color of the non-modified content. In another embodiment, the modified document content is provided with a background color that distinguishes the modified content from the non-modified document content. In yet another embodiment, the highlighted content may be presented in a list such that a user can view all the modified portions of the document together. In still another embodiment, the highlighted content may be exported to a separate file where a user may access the modified document portions.

Transitioning to block 530, the document is displayed such that the user may view the document. In one embodiment, the document is displayed on a monitor of a computer. In another embodiment, the document is displayed with tabs in the margin that identify the pages where the highlighted content is located. The user may select a tab to access the corresponding page. In yet another embodiment, the document is displayed with an author/editor identifier proximate the highlighted content to indicate who created/modified/deleted the highlighted content. In a further embodiment, the author/editor identifier is used to highlight content in different colors such that particular additions/modifications/crossed-out deletions may be associated with the corresponding author/editor.

Continuing to decision block 540, a determination is made whether the user has read all of the highlighted content. In one embodiment, the highlighted content is determined to have been read by the user when the page on which the highlighted content is located is displayed on a monitor of the user's computer. In another embodiment, a determination is made that the user read the highlighted content when the actual modified content is displayed to the user in its entirety. In yet another embodiment, a user is determined to have read the highlighted content when the highlighted content is displayed to the user for a predetermined period of time. If the user has read all of the highlighted content, processing continues at block 560. If the content has not read all of the highlighted content, processing continues at block 550.

Moving to block 550, the relationship between the reader time stamp and the associated highlighted content that has not been read by the user is maintained. The reader time stamp identifies the time when the user last accessed the document. The relationship between the reader time stamp and the associated unread, highlighted content ensures that the next time the user accesses the document the unread, modified content will appear as highlighted content.

Proceeding to block 560, a reader time stamp that identifies the current time is associated with the modified content that has been read by the user. In one embodiment, the current reader time stamp identifies the time when the user closes the document. Processing then terminates at an end block.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for highlighting modified content in a shared document, comprising:
    downloading the document from a server to a client, wherein the document comprises a content container;
    determining if the content container has been modified since the document was previously downloaded to the client;

when the content container has been modified, highlighting the modified content in the content container;

displaying the document;

determining whether the highlighted content has been displayed to a user for at least a predetermined period of time; and when the highlighted content has not been displayed to a user for at least the predetermined period of time, identifying the highlighted content as unread.

2. The computer-implemented method of claim 1, further comprising:

displaying the document with the highlighted content that was identified as unread when the document is subsequently downloaded.

3. The computer-implemented method of claim 1, wherein determining if the content container has been modified further comprises comparing a reader time stamp associated with the content container at the client and an editor time stamp associated with the content container at the server, wherein the reader time stamp indicates the time when the document was previously downloaded to the client and the editor time stamp indicates the time when the content container was last modified.

4. The computer-implemented method of claim 1, wherein displaying the document further comprises displaying the document with the highlighted content and an author identifier, wherein the author identifier indicates the author who modified the highlighted content.

5. The computer-implemented method of claim 1, wherein highlighting the modified content further comprises displaying the modified content in the content container such that the modified content is visually distinct from other portions of the document that have not been modified since the document was previously downloaded.

6. The computer-implemented method of claim 1, further comprising displaying tabs in a margin of the document, wherein the tabs are associated with pages of the document that include highlighted content.

7. The computer-implemented method of claim 1, further comprising presenting the highlighted content in a list.

8. The computer-implemented method of claim 1, further comprising exporting the highlighted content to a file.

9. The computer-implemented method of claim 1, wherein the predetermined time period is proportionate to the size of the content container.

10. A system for highlighting modified content in a shared document, comprising:

a server;

an editor client coupled to the server, wherein the editor client is arranged to: access the document from the server, and modify content in a content container the document;

a reader client coupled to the server, wherein the reader client is arranged to access the document from the server; and a modification highlight module that is located on one of: the reader client and the server, the modification highlight module being arranged to highlight the modified content in the content container when the document is accessed by the reader client, wherein the highlighted content indicates modifications that have been made to the content since the document was previously accessed by the reader client, wherein the document is displayed at the reader client, a determination being made whether the highlighted content bas been displayed to a user for at least a predetermined period of time, and further wherein when the highlighted content has not been displayed to a user for at least the predetermined period of time, the highlighted content being identified as unread.

11. The system of claim 10, wherein the modification highlight module is further arranged to:

display the document with the highlighted content that was identified as unread when the document is subsequently accessed by the reader client.

12. The system of claim 10, wherein the modification highlight module is further arranged to determine if the content container has been modified since a previous document access by comparing a reader time stamp associated with the content container at the reader client and an editor time stamp associated with the content container at the server, wherein the reader time stamp indicates the time of the previous document access by the reader client and the editor time stamp indicates the time when the content container was last modified at the editor client.

13. The system of claim 10, wherein the modification highlight module is further arranged to display the document with the highlighted content and an associated author identifier, wherein the author identifier indicates the author who modified the highlighted content.

14. The system of claim 10, wherein the modification highlight module highlights the modified content by displaying the modified content in the content container such that the modified content is visually distinct from other portions of the document that have not been modified since the document was previously accessed by the reader client.

15. The system of claim 10, wherein the modification highlight module is further arranged to display tabs in a margin of the document, wherein the tabs are associated with pages of the document that include highlighted content.

16. The system of claim 10, wherein the modification highlight module is further arranged to present the highlighted content in a list.

17. The system of claim 10, wherein the predetermined time period is proportionate to the size of the content container.

18. A computer-readable medium having computer-executable instructions for highlighting modified content in a shared document, comprising:

accessing the document from a server, wherein the document comprises a content container;

determining at a client if the content container has been modified since the last time the document was accessed from the server;

when the content container has been modified, highlighting the modified content in the content container;

displaying the document;

determining if the highlighted content has been displayed to a user for at least a predetermined period of time;

when the highlighted content has not been displayed to a user for at least the predetermined period of time, identifying the highlighted content as unread; and displaying the document with the highlighted content that is identified as unread when the document is subsequently accessed.

19. The computer-readable medium of claim 18, wherein determining at the client if the content container has been modified further comprises comparing a reader time stamp associated with the content container at the client and an editor time stamp associated with the content container at the server, wherein the reader time stamp indicates the time of the last document access at the client and the editor time stamp indicates the time when the content container was last modified.

20. The computer-readable medium of claim 18, wherein displaying the document further comprises displaying the document with an author identifier that is associated with the modified content container, wherein the author identifier indicates the author who modified the highlighted content.

21. The computer-readable medium of claim 18, wherein highlighting the modified content further comprises displaying the modified content in the content container such that the modified content is visually distinct from the other portions of the document that have not been modified since the last document access.

22. The computer-readable medium of claim 18, further comprising displaying tabs in a margin of the document, wherein the tabs are associated with pages of the document that include highlighted content.

23. The computer-readable medium of claim 18, wherein the predetermined time period is proportionate to the size of the content container.

* * * * *